United States Patent
Pal et al.

(10) Patent No.: US 12,317,364 B2
(45) Date of Patent: May 27, 2025

(54) TECHNIQUES FOR OPTIMIZING POWER CONSUMPTION IN WIRELESS COMMUNICATION DEVICES

(71) Applicant: QUALCOMM Incorporated, San Diego, CA (US)

(72) Inventors: Arnab Pal, Hyderabad (IN); Vishnu Namboodiri Karakkad Kesavan Namboodiri, Hyderabad (IN); Madhusudan Sathyanarayan, Hyderabad (IN); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/801,722

(22) PCT Filed: Dec. 14, 2020

(86) PCT No.: PCT/US2020/064856
§ 371 (c)(1),
(2) Date: Aug. 23, 2022

(87) PCT Pub. No.: WO2021/221724
PCT Pub. Date: Nov. 4, 2021

(65) Prior Publication Data
US 2023/0100787 A1     Mar. 30, 2023

(30) Foreign Application Priority Data
Apr. 30, 2020  (IN) .............................. 202041018517

(51) Int. Cl.
*H04W 76/28* (2018.01)
*H04W 24/10* (2009.01)
*H04W 56/00* (2009.01)

(52) U.S. Cl.
CPC .......... *H04W 76/28* (2018.02); *H04W 24/10* (2013.01); *H04W 56/001* (2013.01)

(58) Field of Classification Search
CPC ... H04W 76/28; H04W 24/10; H04W 56/001; H04W 52/028; H04W 52/0216; Y02D 30/70; H04B 7/0802; H04B 7/0874
(Continued)

(56) References Cited

U.S. PATENT DOCUMENTS 10,044,438 B2   8/2018   Kadous et al.
10,728,783 B2   7/2020   Hoover et al.
(Continued)

FOREIGN PATENT DOCUMENTS

CN   109845347 A   6/2019
CN   110958093 A   4/2020
(Continued)

OTHER PUBLICATIONS

International Search Report and Written Opinion—PCT/US2020/064856—ISA/EPO—Apr. 12, 2021.

*Primary Examiner* — Hashim S Bhatti
*Assistant Examiner* — Oladiran Gideon Olaleye
(74) *Attorney, Agent, or Firm* — Arent Fox, LLP (57) ABSTRACT

Aspects described herein relate to activating, at a user equipment (UE), a first set of antennas or associated communication resources of the UE to measure a first synchronization signal block (SSB) for synchronizing communications in a first connected mode discontinuous receive (CDRX) period without activating a second set of antennas or associated communication resources of the UE to measure a second SSB, and activating, at the UE, the second set of antennas or associated communication resources of the
(Continued)

UE to measure a second SSB for synchronizing communications in a second CDRX period without activating the first set to measure the first SSB.

30 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0029315 A1* | 1/2020 | Lin | H04W 52/0245 |
| 2020/0195410 A1* | 6/2020 | Li | H04L 1/1819 |
| 2020/0245333 A1* | 7/2020 | Lin | H04L 1/0026 |
| 2021/0329611 A1* | 10/2021 | Karjalainen | H04W 48/12 |
| 2021/0400580 A1* | 12/2021 | Maleki | H04W 52/0216 |
| 2022/0191789 A1* | 6/2022 | Reial | H04W 48/12 |

FOREIGN PATENT DOCUMENTS

| | | |
|---|---|---|
| WO | 2015123573 A2 | 8/2015 |
| WO | 2017087181 A1 | 5/2017 |
| WO | 2019032886 A1 | 2/2019 |
| WO | 2020081719 A1 | 4/2020 |

* cited by examiner

TECHNIQUES FOR OPTIMIZING POWER CONSUMPTION IN WIRELESS COMMUNICATION DEVICES

CROSS REFERENCE TO RELATED APPLICATION(S)

The present Application for Patent is a 35 U.S.C. § 371 National Phase Application of PCT Patent Application No. PCT/US2020/064856 filed Dec. 14, 2020, entitled "TECHNIQUES FOR OPTIMIZING POWER CONSUMPTION IN WIRELESS COMMUNICATION DEVICES," which claims priority to Indian Patent Application No. 202041018517, entitled "TECHNIQUES FOR OPTIMIZING POWER CONSUMPTION IN WIRELESS COMMUNICATION DEVICES" and filed on Apr. 30, 2020, which are assigned to the assignee hereof and hereby expressly incorporated by reference herein for all purposes.

BACKGROUND

Aspects of the present disclosure relate generally to wireless communication systems, and more particularly, to techniques for performing cell selection from one radio access technology to another.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some radio access technologies (RATs), such as 5G NR, user equipment (UEs) can operate in a connected-mode discontinuous receive (CDRX) mode where the UE can periodically sleep (e.g., terminate or reduce power to communication resources) to conserve power for a certain duration (referred to as CDRX OFF), after which the UE can wake (e.g., provide power to the communication resources) for another duration (referred to as CDRX ON) to potentially receive signals from a base station or other device. Where a UE has multiple mechanisms to receive communications (e.g., multiple receivers, multiple radio frequency (RF) chains for receiving, etc.), the UE attempts to synchronize with multiple synchronization signals before each CDRX ON period to ensure that each mechanism is synchronized with a cell in time and/or frequency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication is provided. The method includes activating, at a user equipment (UE), a first set of antennas or associated communication resources of the UE to measure a first synchronization signal block (SSB) for synchronizing communications in a first connected mode discontinuous receive (CDRX) period without activating a second set of antennas or associated communication resources of the UE to measure a second SSB; and activating, at the UE, the second set of antennas or associated communication resources of the UE to measure a second SSB for synchronizing communications in a second CDRX period without activating the first set to measure the first SSB.

In another aspect, an apparatus for wireless communication is provided that includes a transceiver, a memory configured to store instructions, and one or more processors communicatively coupled with the transceiver and the memory. The one or more processors are configured to activate a first set of antennas or associated communication resources of the apparatus to measure a first SSB for synchronizing communications in a first CDRX period without activating a second set of antennas or associated communication resources of the apparatus to measure a second SSB, and activate the second set of antennas or associated communication resources of the apparatus to measure a second SSB for synchronizing communications in a second CDRX period without activating the first set to measure the first SSB.

In another aspect, an apparatus for wireless communication is provided. The apparatus includes means for activating a first set of antennas or associated communication resources of the apparatus to measure a first SSB for synchronizing communications in a first CDRX period without activating a second set of antennas or associated communication resources of the apparatus to measure a second SSB, and means for activating the second set of antennas or associated communication resources of the apparatus to measure a second SSB for synchronizing communications in a second CDRX period without activating the first set to measure the first SSB.

In another aspect, a computer-readable medium including code executable by one or more processors for wireless communications is provided. The code includes code for activating, at a UE, a first set of antennas or associated communication resources of the UE to measure a first SSB for synchronizing communications in a CDRX period without activating a second set of antennas or associated communication resources of the UE to measure a second SSB, and activating, at the UE, the second set of antennas or associated communication resources of the UE to measure a second SSB for synchronizing communications in a second CDRX period without activating the first set to measure the first SSB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to improving power consumption for a device by decreasing a number of synchronization attempts or other procedures performed by the device for a given connected-mode discontinuous receive (CDRX) period. In some wireless communication technologies, such as fifth generation (5G) new radio (NR), for example, a user equipment (UE) can operate in CDRX mode where, for a CDRX period, the UE can periodically sleep to conserve power for a certain duration (referred to as CDRX OFF), after which the UE can wake for another duration (referred to as CDRX ON) to monitor for, and/or potentially receive, signals from a base station or other devices. For example, in CDRX OFF duration, the UE can sleep by terminating or reducing power to certain radio frequency (RF) components of the UE for at least the CDRX OFF duration to conserve power, and then can wake after the CDRX OFF duration by providing power back to the RF components for at least the CDRX ON duration to monitor for, or potentially receive, signals from the base station or other devices. For example, the RF components to which power is terminated, reduced, provided, etc. can include one or more transceivers (or at least receiver portions of the transceivers), other components in a RF chain for receiving signals via one or more antennas (e.g., power amplifiers (PAs), low-noise amplifiers (LNAs), filters, switches, etc.).

In an example, in CDRX defined for 5G NR, a UE can go into a CDRX sleep (CDRX OFF) for certain duration (e.g., CDRX long cycle periodicity can be 80, 160, 320 milliseconds (ms), etc.). As part of CDRX OFF duration, the UE can perform a loop update before starting decoding of downlink communications (e.g., physical downlink control channel (PDCCH) decoding) during CDRX ON duration to synchronize time and/or frequency with a cell. This can be referred to as a warmup mode that occurs during CDRX OFF duration before the CDRX ON duration period begins. The warmup can include activating or otherwise providing power to components of the receiver to operate an associated antenna, such as providing power to one or more RF chain components, as described above, to receive and/or measure synchronization signal blocks (SSBs) during the CDRX OFF duration. This can allow the UE to synchronize communications for, e.g., and prior to, the CDRX ON duration.

In CDRX, where the CDRX cycle periodicity is less than or equal to 160 ms, for example, the UE can choose any SSBs for doing loop update, radio link monitoring (RLM), etc. In warmup mode, when CDRX cycle periodicity is more than 160 ms, the UE can choose the SSBs just before the CDRX ON duration. The loop update can occur in various scenarios, such as for waking up SSBs before CDRX ON duration for loops, where SSBs overlap with CDRX ON duration, where a rude wake up is performed when the UE is in CDRX OFF, etc. In addition, in some modern architectures, because of hardware limitations, the UE can perform loop update for multiple receivers using back-to-back SSBs, e.g., adjacently received SSBs, in staggered manner before the CDRX ON duration. For example, for four receivers, the UE can use two back-to-back SSBs to measure signals for synchronizing the four receivers before each CDRX ON duration.

Currently, in 5G NR, during CDRX period (e.g., during the CDRX OFF duration of the CDRX period), a UE having four receivers (or related RF chains) currently warms up all four receivers by using two consecutive SSBs to synchronize time and/or frequency before CDRX ON duration. For non-CDRX period, the UE can use RLM measurement occasions to schedule receivers 0 and 1 in a first period and receivers 2 and 3 in a second period, etc. in interleaved pattern, but static search and static measurement occur only on receivers 0 and 1. When the UE is doing warmup on all four receivers using two SSBs, the layer 1 (L1, e.g., physical (PHY) layer) timeline can effectively increase during CDRX OFF duration. If SSB periodicity is 20 ms, the L1 timeline can be close to more than 50 ms if warmup SSBs is not aligned with CDRX ON duration. Scheduling more than one SSB during CDRX period can affect UE battery life.

In aspects described herein, a UE can activate a first portion of multiple sets of antennas or related communication resources to measure signals in a first CDRX period (e.g., for warmup loop or otherwise synchronizing for the first CDRX period) and can activate a second portion of the multiple sets of antennas or related communication resources to measure signals in a second (e.g., the next) CDRX period (e.g., for warmup loop or otherwise synchronizing for the second CDRX period). In an example, the UE can alternate between portions of the multiple sets of antennas or related communication resources to measure signals over multiple CDRX periods over a period of time. In this regard, not all sets of antennas or related communication resources are activated for each CDRX period, which can conserve power over the period of time.

The described features will be presented in more detail below with reference to FIGS. 1-5.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
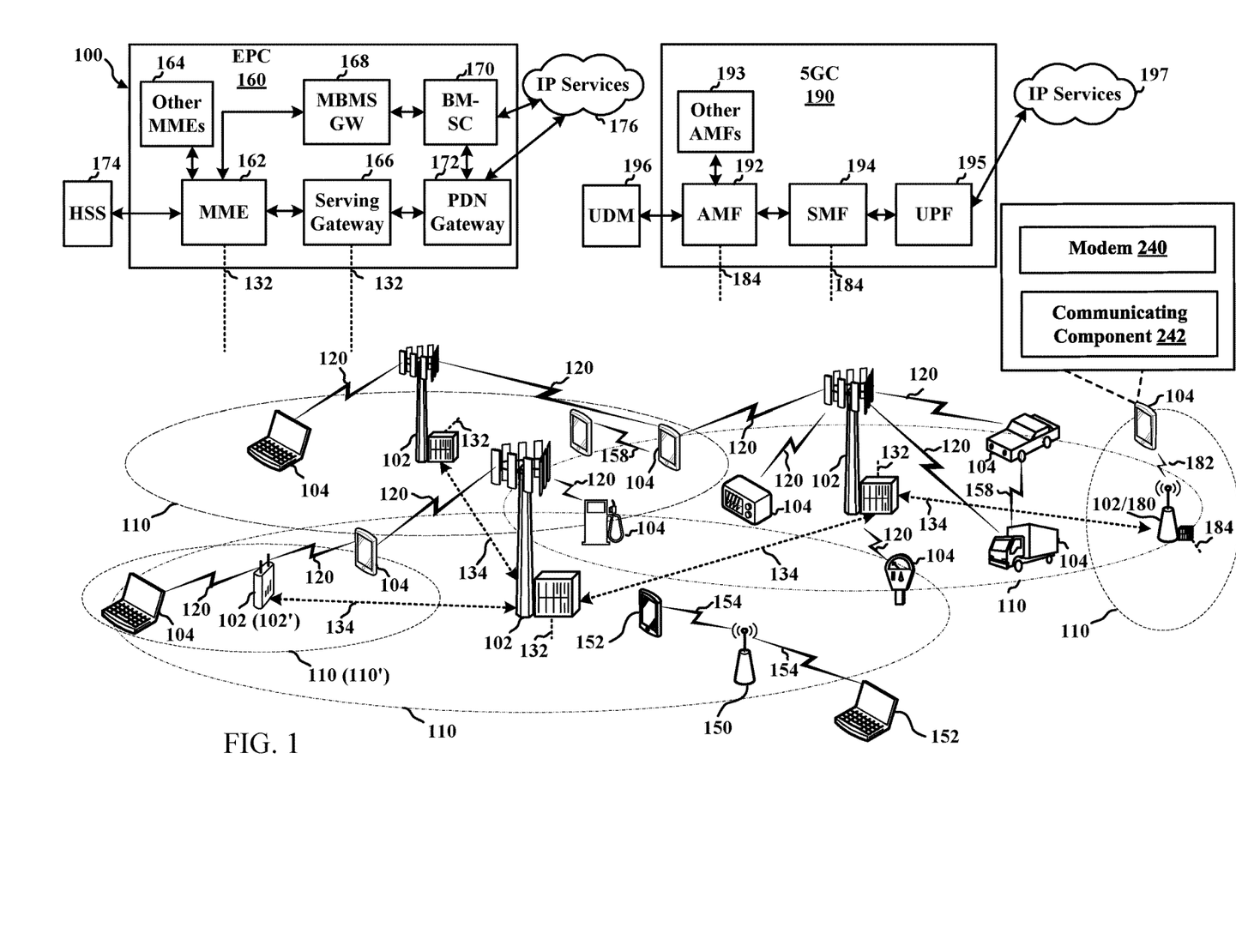
FIG. 1 illustrates an example of a wireless communication system, in accordance with various aspects of the present disclosure.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for activating one or more sets of antennas for receiving and/or measuring signals before a CDRX ON duration, as described herein. Though a UE 104 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5GNR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a UE 104 can include multiple sets of antennas or associated communication resources (e.g., transceivers/receivers, RF chains, etc.). Communicating component 242 of the UE 104 can activate a portion of the multiple sets of antennas or associated communication resources for receiving and/or measuring synchronization signals received from a cell for a first CDRX period. After the first CDRX period (e.g., after transitioning to CDRX ON for the first CDRX period and then to CDRX OFF), communicating component 242 can then activate another portion of the multiple sets of antennas or associated communication resources for receiving and/or measuring synchronization signal received from the cell in a second CDRX period. In an example, the first and second CDRX periods can be adjacent CRDX periods in time. Communicating component 242, for example, can alternate among sets of antennas or associated communication resources used to measure synchronization signals for a given CDRX period or can otherwise define a pattern for using portions of the multiple sets of antennas or associated communication resources in receiving and/or measuring synchronization signals so that not all antennas or associated communication resources are used to receive and/or measure synchronization signals for each CDRX period.

Figure 2:
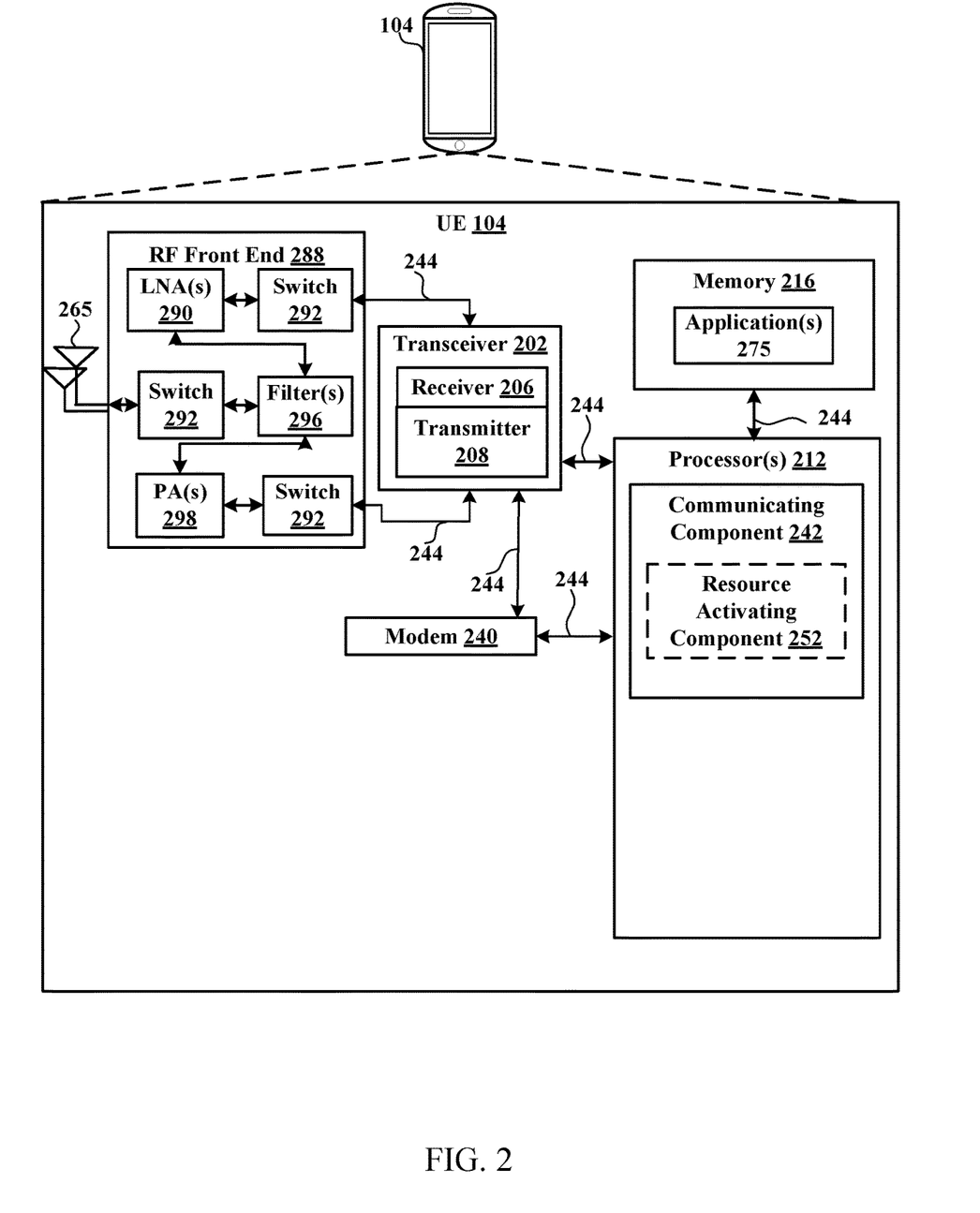
FIG. 2 is a block diagram illustrating an example of a UE, in accordance with various aspects of the present disclosure.
Figure 3:
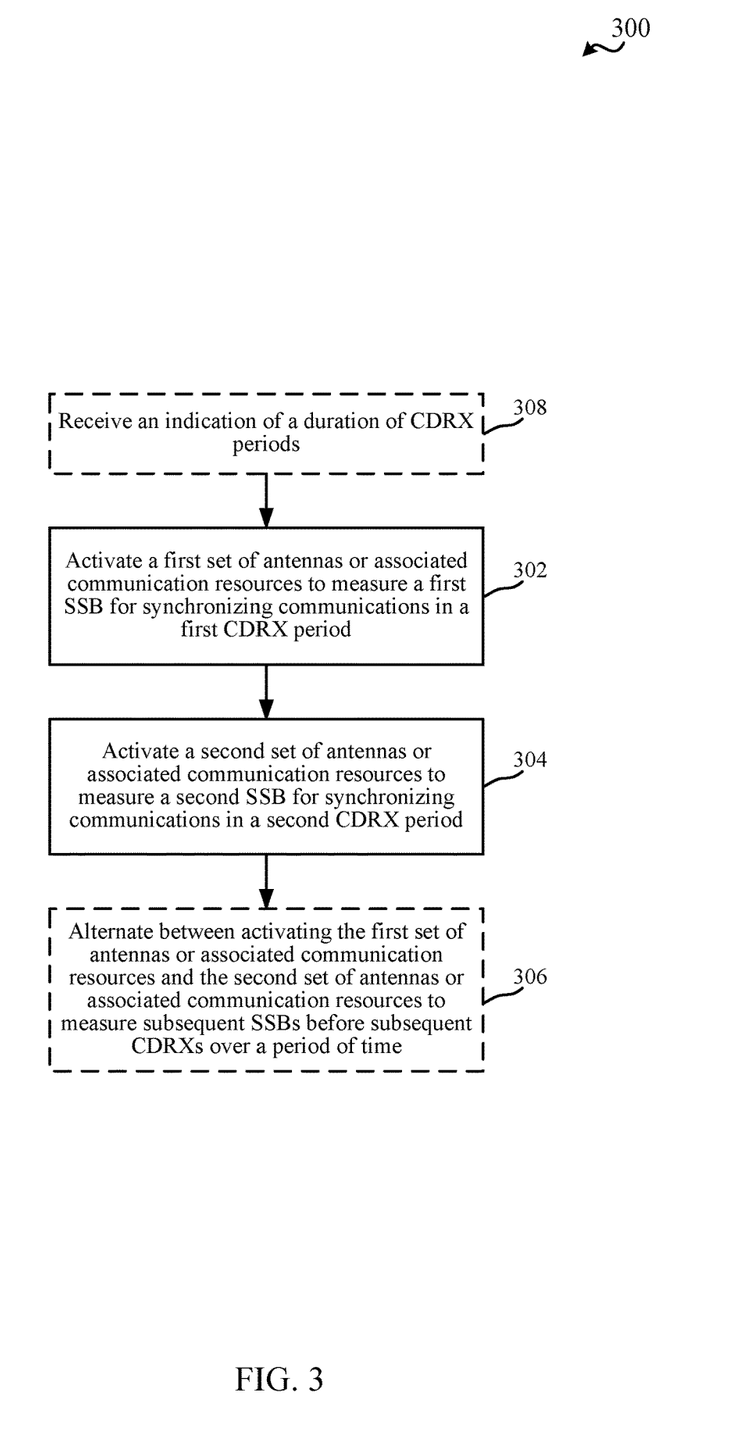
FIG. 3 is a flow chart illustrating an example of a method for activating portions of antennas or associated communication resources for measuring synchronization signals in connected-mode discontinuous receive (CDRX), in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for activating one or more sets of antennas for receiving and/or measuring signals before a CDRX ON duration, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a resource activating component 252 for activating one or more sets of antennas or associated communication resources (e.g., transceivers 202, receivers 206, RF chain components, such as a LNA, PA, filter, switch, etc.) of multiple sets for receiving and/or measuring synchronization signals, as described herein.

In an aspect, the processor(s) 212 may correspond to one or more of the processors described in connection with the UE in FIG. 5. Similarly, the memory 216 may correspond to the memory described in connection with the UE in FIG. 5.

FIG. 3 illustrates a flow chart of an example of a method 300 for activating portions of sets of antennas or associated communication resources to receive synchronization signals for certain CDRX periods, in accordance with aspects described herein. In one example, a UE 104 can perform the functions described in method 300 using one or more of the components described in FIGS. 1 and 2.

In method 300, at Block 302, a first set of antennas or associated communication resources can be activated to measure a first SSB for synchronization communications in a first CDRX period. In an aspect, resource activating component 252, e.g., in conjunction with processor(s) 212, memory 216, transceiver 202, communicating component 242, etc., can activate the first set of antennas or associated communication resources to measure a first SSB for synchronizing communications in a first CDRX period. For example, UE 104 can be communicating in CDRX mode based on CDRX periods having defined CDRX OFF durations and CDRX ON durations. In an example, the CDRX period can be defined at least by a cycle duration, t, indicating a duration of the CDRX period including one CDRX OFF duration and one CDRX ON duration. For example, a CDRX period can begin with a CDRX ON duration of duration n followed by a CDRX OFF duration of duration t-n, after which time the next CDRX period can begin. As described, the antennas or associated communication resources can be deactivated or operating at a reduced power to conserve energy. In an example, during the CDRX OFF duration, antennas or associated communication resources can be activated for a period of time to synchronize timing and/or frequency for the CDRX ON duration of the next CDRX period.

Where the UE is equipped with multiple sets of antennas or associated communication resources (e.g., multiple antennas, transceivers/receivers, RF chains, etc.), current UEs (e.g., operating in 5G NR) can activate the multiple sets of antennas or associated communication resources to measure multiple SSBs for a CDRX period (e.g., in a CDRX OFF duration of a previous CDRX period). In one example, activating a set of antennas or associated communication resources can be part of a search procedure to search for one or more cells with which to communicate in the CDRX period. An example is shown in FIG. 4.

Figure 4:
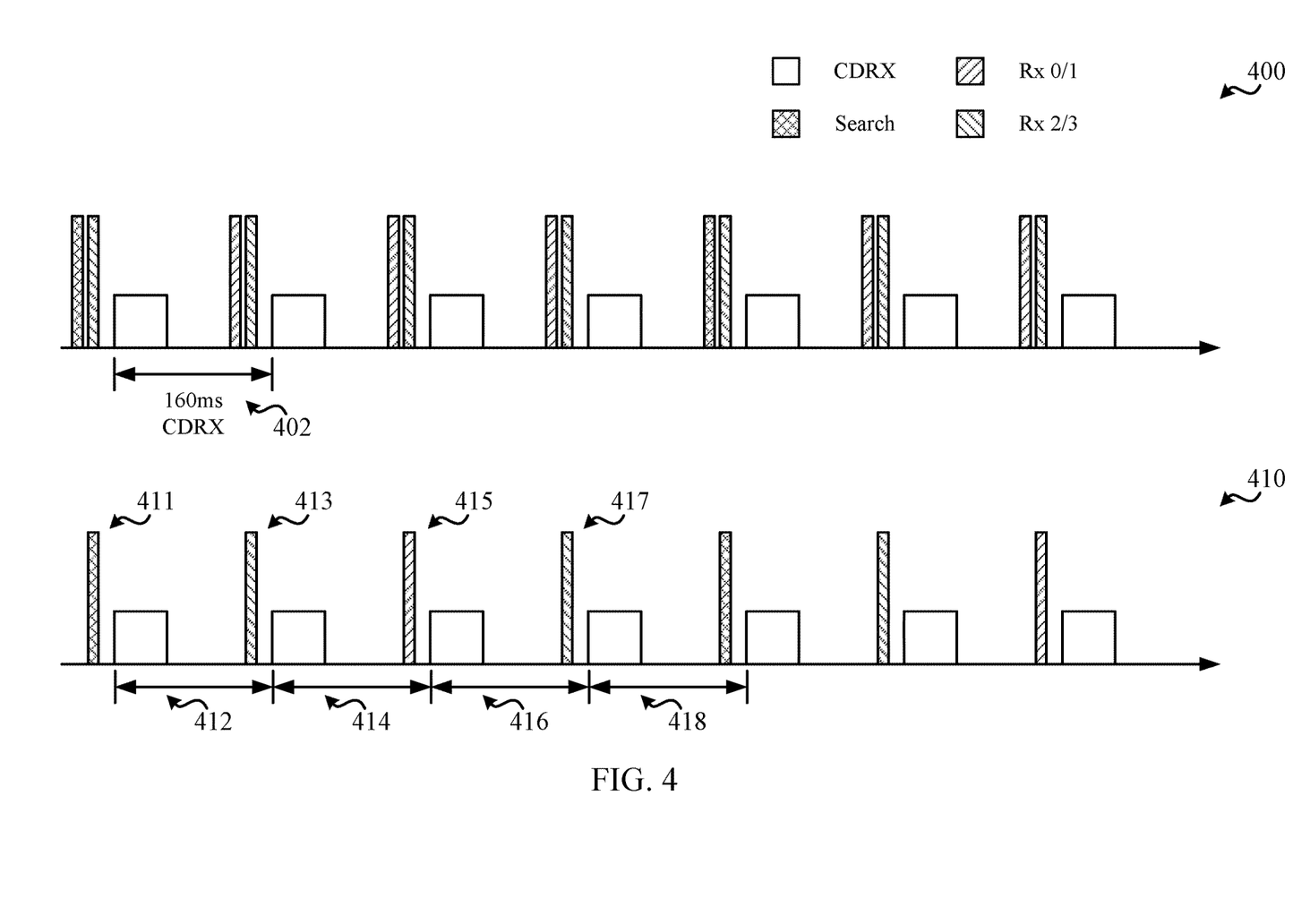
FIG. 4 illustrates examples of timelines for measuring synchronization signals in CDRX, in accordance with various aspects of the present disclosure.

FIG. 4 illustrates examples of timelines 400, 410 for communicating in CDRX mode with multiple sets of antennas or associated communication resources. In timeline 400, the UE can communicate based on a 160 ms CDRX period starting with a CDRX ON duration followed by a CDRX OFF duration during which the UE can measure signals using multiple sets of antennas or associated communication resources, referred to as a first set Rx 0/1 and a second set Rx 2/3, for a next CDRX ON duration of a next CDRX period. During the CDRX ON duration, the UE can activate the antennas or associated communication resources to communicate with one or more base stations. During the CDRX OFF duration (the duration following the CDRX ON duration and before the start of the next CDRX ON duration), such as for CDRX period 402, the UE can deactivate the multiple sets of antennas or associated communication resources to conserve power for a period of time during the CDRX OFF duration. In addition, during the CDRX OFF duration, the UE can activate the first set of antennas or associated communication resources Rx 0/1 for a short period of time to measure a first SSB and then can activate the second set of antennas or associated communication resources Rx 2/3 for a short period of time to measure a second SSB. In other CDRX periods, the UE can activate the first set of antennas or associated communication resources Rx 0/1 to measure a first SSB as part of performing a search procedure and then can activate the second set of antennas or associated communication resources Rx 2/3 to measure a second SSB. As described herein, to lower the amount of time the UE activates antennas or associated communication resources during a CDRX OFF duration, the UE 104 can instead activate only a portion of the multiple sets of antennas or associated communication resources for measuring SSBs for a given CDRX period.

In method 300, at Block 304, a second set of antennas or associated communication resources can be activated to measure a second SSB for synchronization communications in a second CDRX period. In an aspect, resource activating component 252, e.g., in conjunction with processor(s) 212, memory 216, transceiver 202, communicating component 242, etc., can activate the second set of antennas or associated communication resources to measure the second SSB for synchronizing communications in the second CDRX period. In an example, the second CDRX period can be a next CDRX period following the first CDRX period. In addition, the second SSB can be the same or different from the first SSB, can be a next SSB in a cycle or sequence of SSBs, etc. In addition, as described, after activating the first set of antennas or associated communication resources at Block 302, resource activating component 252 can deactivate the first set of antennas or associated communication resources for a remainder of the CDRX OFF duration, then can activate the multiple sets of antennas or associated communication resources (including the first set of antennas or associated communication resources) during a CDRX ON duration of the first CDRX period, then can again deactivate the multiple sets of antennas or associated communication resources during a CDRX OFF duration of the first CDRX period. During this CDRX OFF duration of the first CDRX period, resource activating component 252 can activate the second set of antennas or associated communication resources to measure the second SSB for synchronizing communications in the CDRX ON duration of the second CDRX period.

An example is shown in timeline 410 of FIG. 4. For example, in timeline 410, for CDRX period 412, the UE 104 (e.g., via resource activating component 252) can activate the first set of antennas or associated communication resources Rx 0/1 to perform a search 411 without also activating the second set of antennas or associated communication resources Rx 2/3. The UE 104 can then deactivate the first set of antennas or associated communication resources Rx 0/1 during a time period between the search 411 and the start of CDRX period 412, can activate all antennas or associated communication resources (e.g., Rx 0/1 and Rx 2/3) during the CDRX ON duration of CDRX period 412, and can deactivate all antennas or associated communication resources (e.g., Rx 01/and Rx 2/3) during the CDRX OFF duration of the CDRX period 412.

For CDRX period 414, the UE 104 can activate (e.g., via resource activating component 252) the second set of antennas or associated communication resources Rx 2/3 for measuring a SSB 413 during the CDRX OFF duration of CDRX period 412 for synchronizing the second set of antennas or associated communication resources based on the SSB 413 without activating the first set of antennas or associated communication resources Rx 0/1. The UE 104 can then deactivate the second set of antennas or associated communication resources Rx 2/3 during a time period between the SSB 413 and the start of CDRX period 414, can activate all antennas or associated communication resources (e.g., Rx 0/1 and Rx 2/3) during the CDRX ON duration of CDRX period 414, and can deactivate all antennas or associated communication resources (e.g., Rx 01/and Rx 2/3) during the CDRX OFF duration of the CDRX period 414.

For CDRX period 416, the UE 104 can activate the first set of antennas or associated communication resources Rx 0/1 for measuring a SSB 415 during the CDRX OFF duration of CDRX period 414 for synchronizing the first set of antennas or associated communication resources based on the SSB 415 without activating the second set of antennas or associated communication resources Rx 2/3. The UE 104 can then deactivate the first set of antennas or associated communication resources Rx 0/1 during a time period between the SSB 415 and the start of CDRX period 416, can activate all antennas or associated communication resources (e.g., Rx 0/1 and Rx 2/3) during the CDRX ON duration of CDRX period 416, and can deactivate all antennas or associated communication resources (e.g., Rx 01/and Rx 2/3) during the CDRX OFF duration of the CDRX period 416.

For CDRX period 418, the UE 104 can activate the second set of antennas or associated communication resources Rx 2/3 for measuring a SSB 417 during the CDRX OFF duration of CDRX period 416 for synchronizing the second set of antennas or associated communication resources based on the SSB 417 without activating the first set of antennas or associated communication resources Rx 0/1. The UE 104 can then deactivate the second set of antennas or associated communication resources Rx 2/3 during a time period between the SSB 417 and the start of CDRX period 418, can activate all antennas or associated communication resources (e.g., Rx 0/1 and Rx 2/3) during the CDRX ON duration of CDRX period 418, and can deactivate all antennas or associated communication resources (e.g., Rx 01/and Rx 2/3) during the CDRX OFF duration of the CDRX period 418, and so on.

Thus, in an example, the UE 104 can define a pattern for activating a portion of the multiple sets of antennas or associated communication resources to synchronize communications for each CDRX period (instead of all antennas or associated communication resources) to conserve power during the CDRX period (e.g., during the CDRX OFF duration). In one example, the pattern can include alternating between the sets of antennas or communication resources (e.g., whether for performing search or otherwise measuring SSBs for timing and/or frequency synchronization with the cell).

For example, in method 300, optionally at Block 306, activating the first set of antennas or associated communication resources and the second set of antennas or associated communication resources can be alternated between to measure subsequent SSBs before subsequent CDRXs over a period of time. In an aspect, resource activating component 252, e.g., in conjunction with processor(s) 212, memory 216, transceiver 202, etc., can alternate between activating the first set of antennas or associated communication resources and the second set of antennas or associated communication resources to measure subsequent SSBs before subsequent CDRXs over a period of time. As shown in FIG. 4, for example, the resource activating component 252 can activate a first set of antennas or associated communication resources Rx 0/1 and a second set of antennas or associated communication resources Rx 2/3 for measuring SSBs (whether part of a search or otherwise) for consecutive CDRX periods. Though shown for two sets of antennas or associated communication resources, the concepts can be applied for additional sets of antennas or communication resources (e.g., to alternate all sets to be used once, to use a reduced number of sets, but possible multiple sets, in each CDRX period, etc.). For example, resource activating component 252 can select the sets of antennas or associated communication resources to activate in consecutive CDRX periods to balance desired power consumption with synchronization and quality of communications.

As described above and in reference to FIG. 4, to improve UE power consumption (e.g., and thus UE battery life), the UE can do warmup during CDRX period on alternate Rx chain using one SSB. If UE is doing warmup on Rx 0/1 during current CDRX period then in next CDRX period UE can do warmup on Rx 2/3. This can be applicable for CDRX period of certain durations (e.g., <=160 ms only) to save RF power during CDRX period and make L1 timeline during CDRX OFF lesser so that even if UE is doing warmup on Rx chains, it can do for shorter time. For CDRX period of more than 160 ms, for example, the loop update is more sparse in timeline, so alternate Rx in this regard may not provide as much benefit.

Accordingly, in method 300 for example, optionally at Block 308, an indication of a duration of CDRX periods can be received. In an aspect, communicating component 242, e.g., in conjunction with processor(s) 212, memory 216, transceiver 202, etc., can receive the indication of the duration of CDRX periods. For example, communicating component 242 can receive the indication in a configuration from the base station for perform CDRX (e.g., in downlink control signaling). In an example, resource activating component 252 can determine whether or not to activate the portion (e.g., the first set) of antennas or associated communication resources without activating another portion (e.g., the second set) of antennas or associated communication resources based on the duration of CDRX periods. For example, resource activating component 252 can determine to activate the portions of antennas or associate communication resources based on the pattern, as described above (e.g., as shown in timeline 410 of FIG. 4), based on determining that the duration of CDRX periods is at a certain value or less than (or greater than) a certain value (e.g., less than or equal to 160 ms). In this example, resource activating component 252 may determine to activate all antennas or associated communication resources for a given CDRX period (e.g., to activate all antennas or associated communication resources in multiple sets for each CDRX period, as shown in timeline 400 of FIG. 4) based on determining that the duration of CDRX periods is greater than a certain value (e.g., 160 ms).

Figure 5:
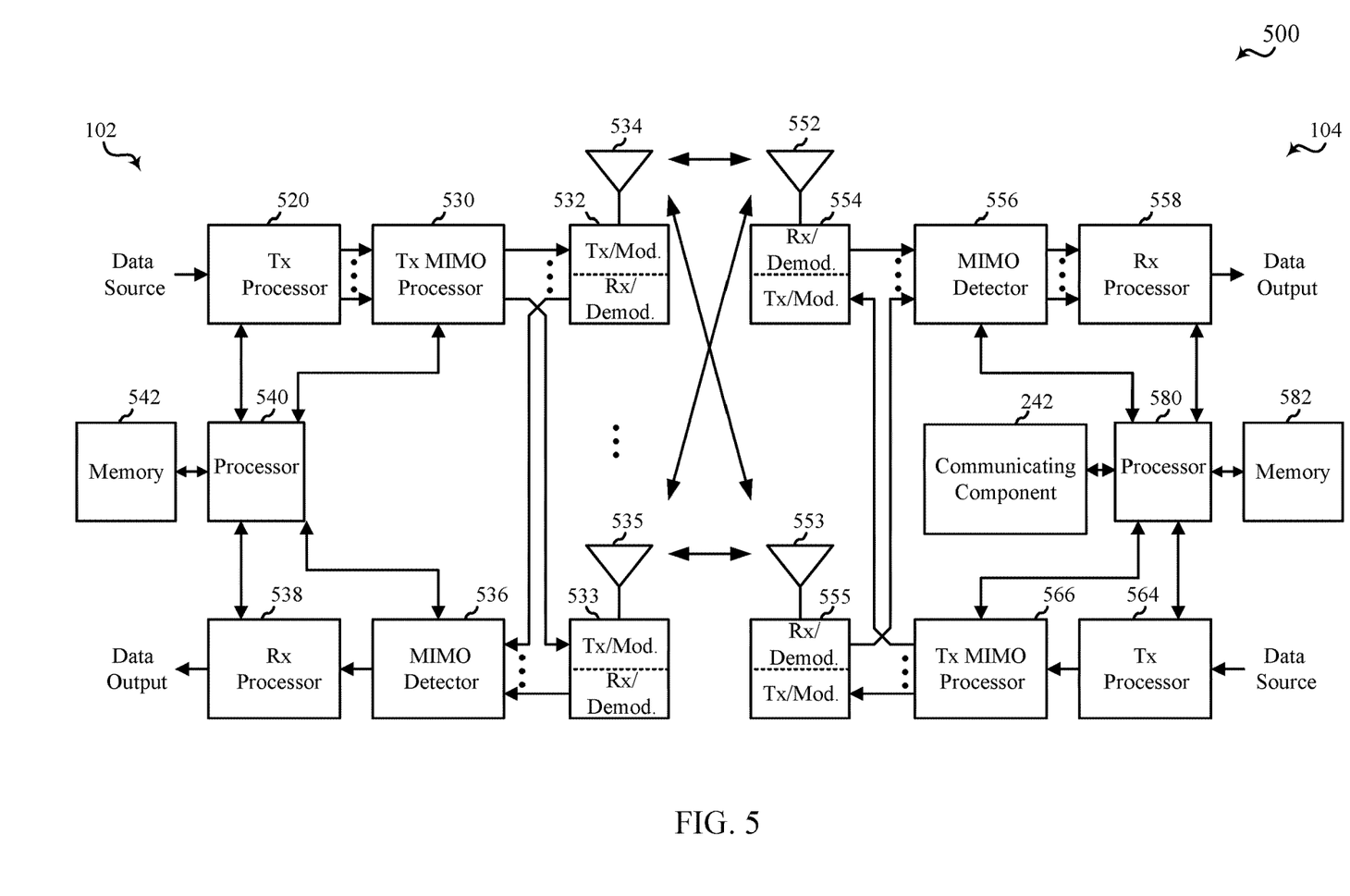
FIG. 5 is a block diagram illustrating an example of a MIMO communication system including a base station and a UE, in accordance with various aspects of the present disclosure.

FIG. 5 is a block diagram of a MIMO communication system 500 including a base station 102 and a UE 104, in accordance with various aspects of the present disclosure. The MIMO communication system 500 may illustrate aspects of the wireless communication access network 100 described with reference to FIG. 1. The base station 102 may be an example of aspects of the base station 102 described with reference to FIG. 1. The base station 102 may be equipped with antennas 534 and 535, and the UE 104 may be equipped with antennas 552 and 553. In the MIMO communication system 500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104 may be an example of aspects of the UEs 104 described with reference to FIGS. 1-2. At the UE 104, the UE antennas 552 and 553 may receive the DL signals from the base station 102 and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104 to a data output, and provide decoded control information to a processor 580, or memory 582.

The processor 580 may in some cases execute stored instructions to instantiate a communicating component 242 (see e.g., FIGS. 1 and 2).

On the uplink (UL), at the UE 104, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the base station 102 in accordance with the communication parameters received from the base station 102. At the base station 102, the UL signals from the UE 104 may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The components of the UE 104 may, individually or collectively, be implemented with one or more ASICs adapted to perform some or all of the applicable functions in hardware. Each of the noted modules may be a means for performing one or more functions related to operation of the MIMO communication system 500. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 500.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
    activating, at a user equipment (UE), a first set of antennas or associated communication resources of the UE to measure a first synchronization signal block (SSB) for synchronizing communications in a first connected mode discontinuous receive (CDRX) period without activating a second set of antennas or associated communication resources of the UE to measure a second SSB; and
    activating, at the UE, the second set of antennas or associated communication resources of the UE to measure a second SSB for synchronizing communications in a second CDRX period without activating the first set to measure the first SSB.

2. The method of claim 1, wherein the second CDRX period is a next CDRX period following the first CDRX period.

3. The method of claim 1, further comprising alternating between activating the first set and activating the second set to measure subsequent SSBs before subsequent CDRXs over a period of time.

4. The method of claim 3, wherein alternating at least includes activating, at the UE, the first set to measure the first SSB or a third SSB for synchronizing communications in a third CDRX period without activating the second set to measure the second SSB.

5. The method of claim 4, wherein the second CDRX period is a next CDRX period following the first CDRX period, and wherein the third CDRX period is a next CDRX period following the second CDRX period.

6. The method of claim 1, further comprising activating, at the UE, a third set of antennas or associated communication resources of the UE to measure a third SSB for synchronizing communications in a third CDRX period without activating the first set to measure the first SSB or the second set to measure the second SSB.

7. The method of claim 1, wherein activating the first set is part of a search procedure performed by the UE to search for a cell for communicating in the first CDRX period.

8. The method of claim 1, wherein activating the first set to measure the first SSB for synchronizing communications in the first CDRX period without activating the second set to measure the second SSB is based at least in part on determining a duration of the first CDRX period.

9. The method of claim 8, further comprising receiving an indication of the duration of the first CDRX period in a configuration from a base station.

10. The method of claim 8, wherein determining the duration of the first CDRX period comprises determining that the duration of the first CDRX period is less than or equal to 160 milliseconds.

11. An apparatus for wireless communication, comprising:
a transceiver;
a memory configured to store instructions; and
one or more processors communicatively coupled with the transceiver and the memory, wherein the one or more processors are configured to:
activate a first set of antennas or associated communication resources of the apparatus to measure a first synchronization signal block (SSB) for synchronizing communications in a first connected mode discontinuous receive (CDRX) period without activating a second set of antennas or associated communication resources of the apparatus to measure a second SSB; and
activate the second set of antennas or associated communication resources of the apparatus to measure a second SSB for synchronizing communications in a second CDRX period without activating the first set to measure the first SSB.

12. The apparatus of claim 11, wherein the second CDRX period is a next CDRX period following the first CDRX period.

13. The apparatus of claim 11, wherein the one or more processors are further configured to alternate between activating the first set and activating the second set to measure subsequent SSBs before subsequent CDRXs over a period of time.

14. The apparatus of claim 13, wherein the one or more processors are configured to alternate at least in part by activating the first set to measure the first SSB or a third SSB for synchronizing communications in a third CDRX period without activating the second set to measure the second SSB.

15. The apparatus of claim 14, wherein the second CDRX period is a next CDRX period following the first CDRX period, and wherein the third CDRX period is a next CDRX period following the second CDRX period.

16. The apparatus of claim 11, wherein the one or more processors are further configured to activate a third set of antennas or associated communication resources of the apparatus to measure a third SSB for synchronizing communications in a third CDRX period without activating the first set to measure the first SSB or the second set to measure the second SSB.

17. The apparatus of claim 11, wherein the one or more processors are configured to activate the first set as part of a search procedure performed by the apparatus to search for a cell for communicating in the first CDRX period.

18. The apparatus of claim 11, wherein the one or more processors are configured to activate the first set to measure the first SSB for synchronizing communications in the first CDRX period without activating the second set to measure the second SSB based at least in part on determining a duration of the first CDRX period.

19. The apparatus of claim 18, wherein the one or more processors are further configured to receive an indication of the duration of the first CDRX period in a configuration from a base station.

20. The apparatus of claim 18, wherein the one or more processors are configured to determine the duration of the first CDRX period as less than or equal to 160 milliseconds.

21. An apparatus for wireless communication, comprising:
means for activating a first set of antennas or associated communication resources of the apparatus to measure a first synchronization signal block (SSB) for synchronizing communications in a first connected mode discontinuous receive (CDRX) period without activating a second set of antennas or associated communication resources of the apparatus to measure a second SSB; and
means for activating the second set of antennas or associated communication resources of the apparatus to measure a second SSB for synchronizing communications in a second CDRX period without activating the first set to measure the first SSB.

22. The apparatus of claim 21, wherein the second CDRX period is a next CDRX period following the first CDRX period.

23. The apparatus of claim 21, further comprising means for alternating between activating the first set and activating the second set to measure subsequent SSBs before subsequent CDRXs over a period of time.

24. The apparatus of claim 23, wherein the means for alternating at least includes means for activating the first set to measure the first SSB or a third SSB for synchronizing communications in a third CDRX period without activating the second set to measure the second SSB.

25. The apparatus of claim 24, wherein the second CDRX period is a next CDRX period following the first CDRX period, and wherein the third CDRX period is a next CDRX period following the second CDRX period.

26. A non-transitory computer-readable medium, comprising code executable by one or more processors for wireless communications, the code comprising code for:
activating, at a user equipment (UE), a first set of antennas or associated communication resources of the UE to measure a first synchronization signal block (SSB) for synchronizing communications in a first connected mode discontinuous receive (CDRX) period without activating a second set of antennas or associated communication resources of the UE to measure a second SSB; and activating, at the UE, the second set of antennas or associated communication resources of the UE to measure a second SSB for synchronizing communications in a second CDRX period without activating the first set to measure the first SSB.

27. The non-transitory computer-readable medium of claim 26, wherein the second CDRX period is a next CDRX period following the first CDRX period.

28. The non-transitory computer-readable medium of claim 26, further comprising code for alternating between activating the first set and activating the second set to measure subsequent SSBs before subsequent CDRXs over a period of time.

29. The non-transitory computer-readable medium of claim 28, wherein the code for alternating at least includes code for activating, at the UE, the first set to measure the first SSB or a third SSB for synchronizing communications in a third CDRX period without activating the second set to measure the second SSB.

30. The non-transitory computer-readable medium of claim 29, wherein the second CDRX period is a next CDRX period following the first CDRX period, and wherein the third CDRX period is a next CDRX period following the second CDRX period.

* * * * *